United States Patent

Vitenko

[15] 3,665,681
[45] May 30, 1972

[54] SMOKE CLEANING APPARATUS

[72] Inventor: Andrew H. Vitenko, 600 West 146th Street, Apt. 43, New York, N.Y. 10031

[22] Filed: Oct. 13, 1970

[21] Appl. No.: 80,321

[52] U.S. Cl.................................55/260, 55/467, 55/515, 110/8 R, 110/119, 261/118, 417/250, 417/503
[51] Int. Cl..........................................................B01d 50/00
[58] Field of Search....................55/93, 220, 228, 260, 307, 55/258, 250, 315, 421, 615, 467, 470–472; 60/29, 30; 261/118, 28, 82, 17; 110/119, 8; 417/254, 250, 503

[56] References Cited

UNITED STATES PATENTS

| | | | |
|---|---|---|---|
| 1,739,372 | 12/1929 | Pirchio | 55/515 |
| 1,759,617 | 5/1930 | Hoerbiger | 417/250 |
| 2,160,309 | 5/1939 | Huffman | 261/SC |
| 2,881,749 | 4/1959 | Pringham | 417/250 |
| 3,100,376 | 8/1963 | Potter | 55/233 |
| 3,465,504 | 9/1969 | Oropezc et al | 261/17 |
| 3,537,239 | 11/1970 | Dunmire | 55/472 |

*Primary Examiner*—Bernard Nozick
*Attorney*—Polachek, Saulsbury & Hough

[57] ABSTRACT

A smoke cleaning apparatus has been provided for effecting the cleaning of the smoke particles from the smoke and the absorption of the gasses by water spray or pressure injected devices. The apparatus is formed of top and bottom parts, a mesh basket supported on the bottom part and a filter supporting ring disposed in the mesh basket and having vertically spaced inwardly extending flanges and a filtering mass unit having a tapered side surface fitting and conforming generally to the edges of the inwardly extending flanges of the ring to provide annular spaces about the filtering mass communicating with the tapered side face of the filtering mass to allow for entry and re-entry of the smoke into the filtering mass to provide for maximum use of the filtering material. A suction fan is provided in the bottom part for effecting generally the suction of the smoke through the filtering mass and in the outward conduit from the suction fan the water spray, or the water injected cylinder device is connected.

4 Claims, 5 Drawing Figures

Patented May 30, 1972 3,665,681

INVENTOR.
ANDREW H. VITENKO
BY Polachek & Saulsbury
ATTORNEYS

Patented May 30, 1972

INVENTOR.
ANDREW H. VITENKO

BY Polachek & Saulsbury
ATTORNEYS

Patented May 30, 1972 3,665,681

INVENTOR.
ANDREW H. VITENKO

BY Polachek & Saulsbury
ATTORNEYS

SMOKE CLEANING APPARATUS

This invention relates to the smoke cleaning apparatus.

The principal object of the smoke cleaning apparatus is to provide an apparatus which the smoke will be cleaned by a filtering mass centrally mounted within the apparatus and through which the smoke is drawn by a suction fan underlying the filtering mass and with which annular smoke conduits are provided about the periphery of the filtering mass to provide added filtering surfaces for smoke in passing through the mass.

It is another object of the invention to provide a smoke cleaning apparatus in which not only will the smoke particles be removed from the smoke, but wherein provision is made for the removal of gases continuing with the smoke that are not subjected to filtering procedure, but which will be absorbed by water sprayed or injected into the conduit removing the product of combustion from the apparatus casing.

It is a further object of the invention to provide in a smoke cleaning apparatus a water injection system for injecting the water into the gases under pressure as may be effected by a two-way cylinder device so that the remaining gases so treated will become substantially absorbed by the water and removed from the cleaning apparatus with the water.

Other objects of the invention are to provide a smoke cleaning apparatus, having the above objects in mind, which is of simple construction, easy to assemble and disassemble, easy to replace filtering mass, has a minimum number of parts, easy to manufacture, durable and effective and efficient in operation.

For a better understanding of the invention, reference may be had to the following detailed description in connection with the accompanying drawings, in which.

Figure 1:
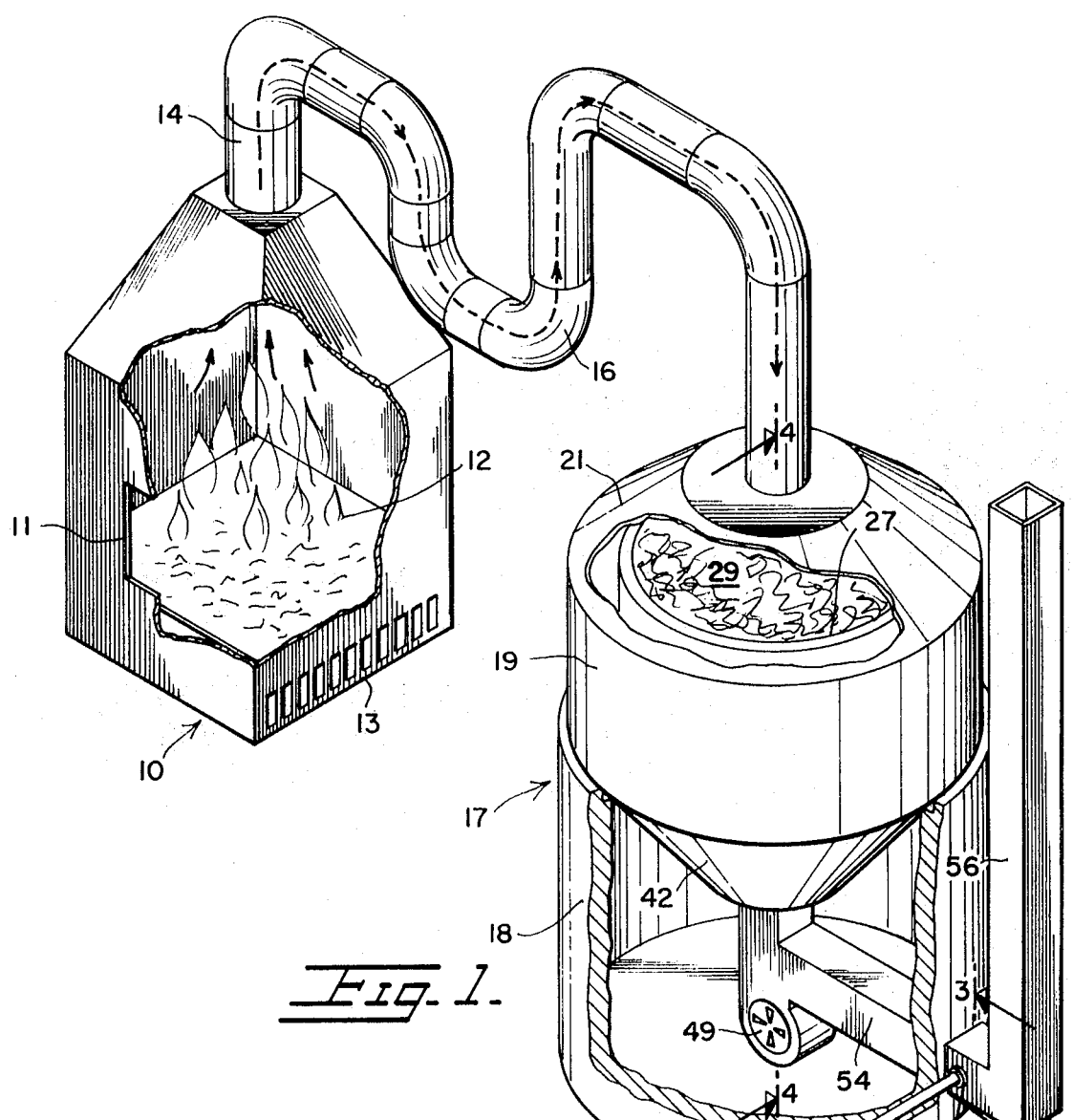
FIG. 1 is a perspective view of an incinerator connected with the smoke cleaning apparatus embodying the features of the present invention.

Referring now to the figures, 10 generally represents a smoke generator, such as an incinerator, that has an opening 11 in the front thereof, a grate 12 on which the material to be incinerated is placed and an underdraft opening 13 to provide air for combustion. The top of the incinerator 10 has a smoke outlet 14 from which there extends a smoke conduit 16 through which the smoke is conducted to the smoke cleaning apparatus indicated generally at 17 that embodies the features of the present invention. It is to be understood that this smoke can be received not only from an incinerator, but from any gas or smoke generating apparatus.

This smoke cleaning apparatus comprises generally a tubular support 18 on which a casing 19 is supported. This casing 19 has a top truncated portion 21 to which the smoke conduit 16 is connected so as to direct the smoke downwardly into the top of the casing 19 and over smoke filtering material 22 generally in the form of an enlarged disc and supported in a ring 23 that has a series of inwardly extending flanges 24, 25, 26, 27 and 28, the top flange 24 being of less width than the lower most flange 28, and with the intermediate flanges 25, 26, and 27 being respectively of varying widths so that their inner edges when taken with the top and bottom flanges provide generally a support which will accommodate the tapered side wall 29 of the filtering mass 22. The filtering mass is thus supported on the flanges so that between the internal flanges there is provided a series of air space rings about the tapered wall 29 of the filtering mass 22, allowing the smoke to pass laterally outwardly and into the annular chambers for distribution about the filtering mass 22 and for re-entry into the mass 22, thereby allowing the filtering mass 22 to be more effective and the passage of smoke through the filtering material assured. These annular spaces are indicated generally at 31, 32, 33 and 34. Thus if the filtering mass becomes clogged at any time with smoke material the mass can still be rendered effective since the smoke will be distributed by the different annular spaces within the ring 23 and between the radially inwardly extending flanges thereof.

Ring 23 is formed of solid plate material and is supported and adapted to be contained in a mesh basket 36, having a cylindrical side wall 37 that is slightly higher than the ring 23, but since it is made of mesh material there is little hindrance given to the passage of the smoke there-through.

This mesh basket 36 has its bottom resting on the annular shoulder 41 of the tapered bottom portion 42, providing a chamber 43 into which the filtered smoke or remaining combustion gases are directed. The mesh screen 36 holds this filtering material and prevents pieces of the same from entering the chamber 43.

The bottom portion 42 has an outer flange portion 44 that rests upon and in a recess 45 of the support 18. Wherein this annular portion 45 has an upturned peripheral flange 46 to give rigidity to the annular portion 44. The top casing 19 is open at its lower end and acts more or less like a hood cover fitted over the filtering material and since it is of greater diameter than the ring 23, of the ring 23 being centrally located, it has provided an annular space 47 into which the smoke can be extended from a top chamber 48 and can circulate annularly around the filtering material before moving upwardly for down movement from the upper surface of the filtering material 22. All of the smoke must enter through top surface and should move directly downwardly when vacuum is provided in the bottom space by the suction fan 49. The bottom casing 42 has a central opening 51 through which the partially cleaned smoke passes and by a baffle 52 is directed and drawn into the periphery of the suction fan and forced through a bottom laterally extending conduit 54. In order to remove final smoke ash and poisonous gasses from the filtered smoke there is provided in this conduit a water spray device 55, from which a vertical portion 56 extends upwardly and from which cleaned smoke or any remaining products of combustion are extended to the atmosphere.

Figure 3:
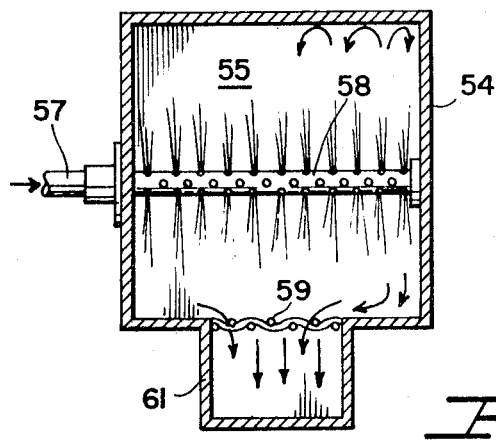
FIG. 3 is an enlarged vertical sectional view of the water spray cleaner feature lying in the chimney outlet and as viewed on line 3—3 of FIG. 1.
Figure 2:
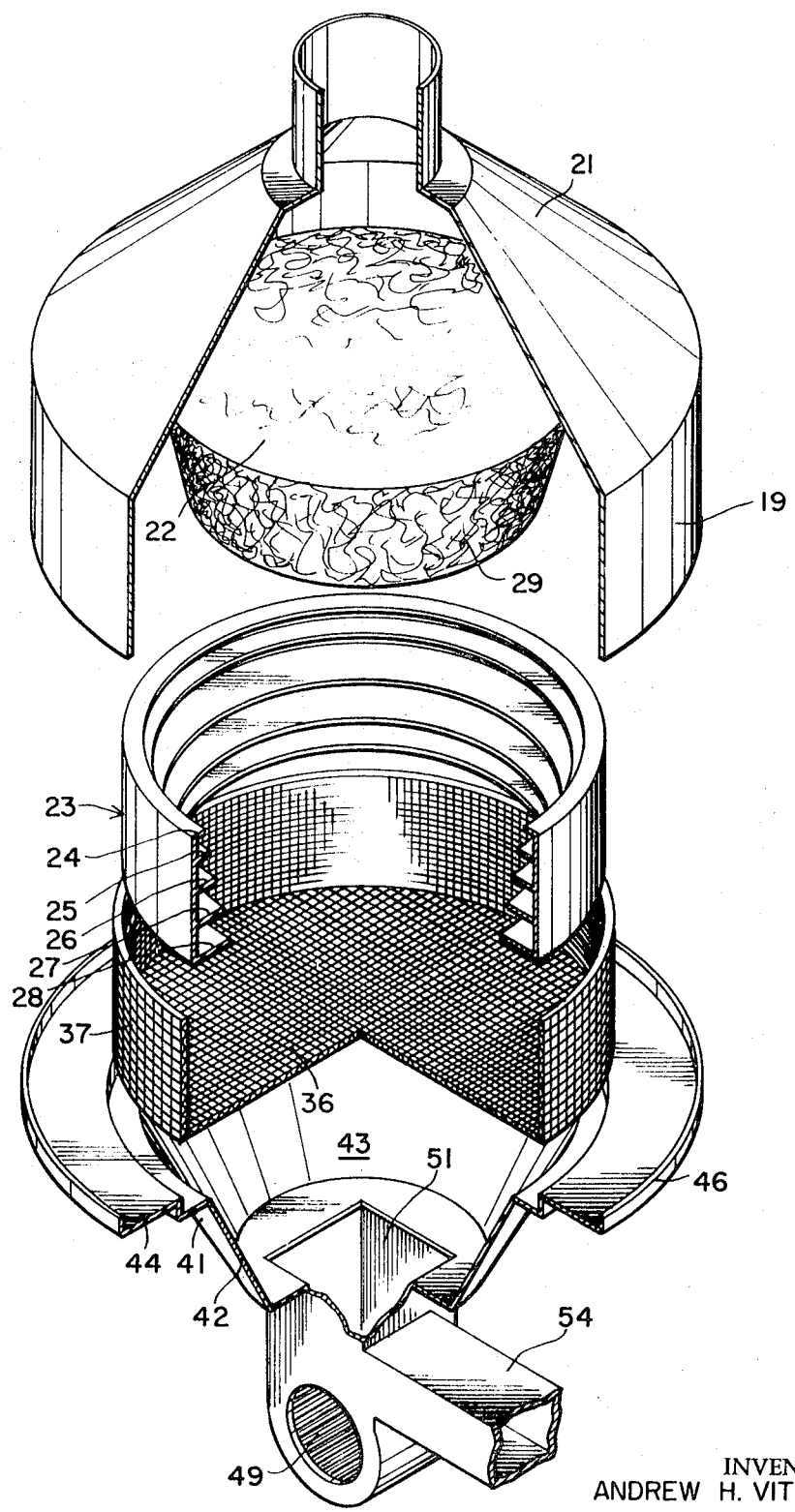
FIG. 2 is an exploded and perspective view of the several parts of the smoke cleaning apparatus.
Figure 4:
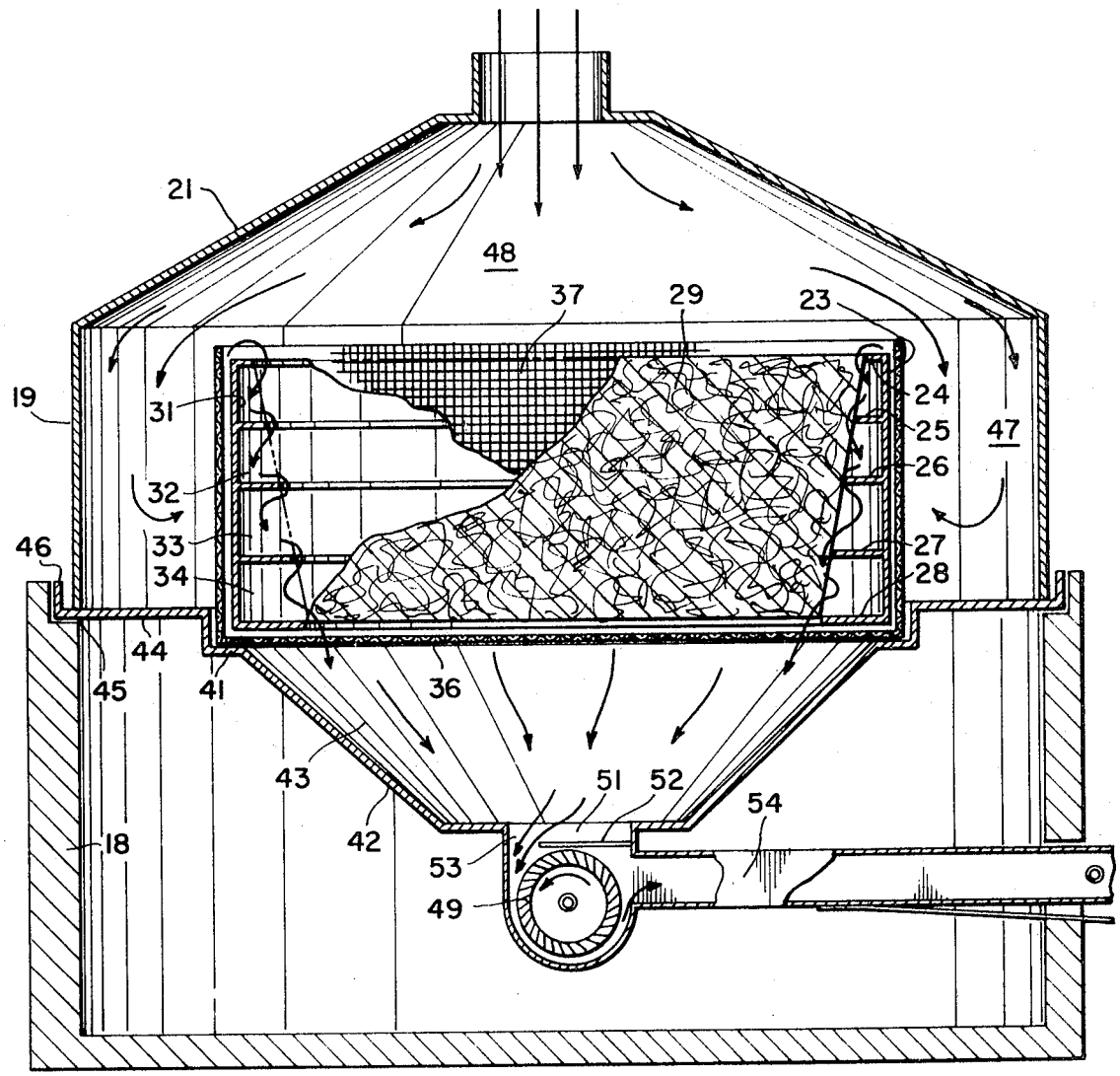
FIG. 4 is an enlarged vertical sectional view of the vertical cleaning apparatus with portions of the filtering material broken away.

This spray device, as best shown in FIG. 3, comprises a water inlet pipe 57 that extends across the sides of the conduit 54 and on which there is provided a spray head 58 that extends a water spray in many directions filling the space within the conduit 54 at the location of the spray device with water spray, through which spray the smoke is forced by the fan 49. The water will absorb remaining particles of the smoke that may have passed the filtering material and again disolve various products of combustion and gasses so that there is little destructive products of combustion finally expelled to the atmosphere. The water will have collected in the bottom of the conduit 54 and delivered through a mesh screen 59 that may collect any of the filtering material that may have passed through the filter and into a water sump 61 from which the water can be drawn and delivered to a sewer.

Figure 5:
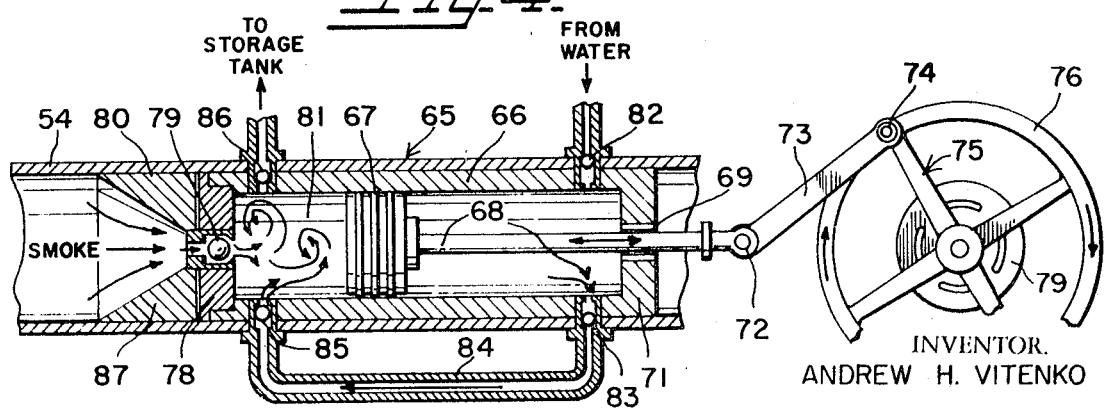
FIG. 5 is a fragmentary longitudinal sectional view illustrating a modified water cleaning device used in the chimney outlet.

It should be apparent from this smoke cleaning apparatus that a smoke entering the top of the apparatus is not only filtered by the filtering material 22, but is further purified before reaching the atmosphere by a water spray device 55. In FIG. 5, there is shown generally a water injector device 65, which will force water into concentrated smoke to mix smoke with the water under pressure and so that there need not be any chimney for conduction to the atmosphere of any final products of combustion and wherein the smoke will be completely dissolved in the water that has passed into the smoke. This device 65, comprises a cylinder 66, that is fitted into the conduit 54, which is preferably of round circular section, and in which there is longitudinally movable a pressure piston 67 having a piston rod 68 that extends forwardly through a bushing 69 in the forward closed end 71 on the cylinder 66. This piston rod 68 is connected by a pivot pin 72 to a free link 73 that is in turn connected by a pivot pin 74 to a handle-shaped crank wheel 75, having a hand ring 76 and a electric motor 77 which will normally drive the piston back and forth in the cylinder 66.

The opposite end of the cylinder 66 is closed by a closure head 78 having a one-way ball valve 79 that will be closed against a seat 80 as piston 67 is moved toward the ball valve 79 and which will open to allow smoke from the conduit 54 to enter the piston chamber 81 as the piston 67 is moved from the left end of the cylinder 66 to the right end. During this retraction stroke, water which is normally entered the cylinder 66 through a one-way ball inlet valve 82 is forced passed the ball valve 83 into a bypass 84 and passed a ball valve 85 into the smoke end of the chamber to commingle with the smoke and absorb the same, so that with a full accumulation of water in the smoke end of this cylinder, the smoke would have been absorbed or dissolved so that on the stroke of the piston 67 from the right to the left, the ball valve 79 would close against seat 80 and water with the smoke dissolved in the same will be forced pass a ball valve 86 and delivered to a storage tank or to a sewer. The need of passing the products of combustion to the atmosphere would have been eliminated by this pressurized water device.

A funnel-shaped ring 87 is provided in front of the ball valve 79 to concentrate the flow of smoke into the piston chamber 81. Upon the piston 67 being moved to the right, both smoke and water are pulled into the cylinder chamber 81. At this time the ball valve 86 will be closed, the smoke ball valve 79 will be open and the water ball valve 85 will be open so that water is forced from the piston rod end of the chamber 81 into the smoke entrance end of the chamber.

It is expected with the filtering material 22 arranged in the smoke cleaning apparatus within an internally flanged ring 23 that the smoke will be ridded of the carbon elements and the only remaining products of combustion would be such gasses that have no body or smoke particles to them will pass into the bottom chamber 43 to be removed by the suction pump 49 through the conduit 54 and which are acted upon by the water treated with the same so that such gasses will be actually absorbed or dissolved by the water. While some of the gasses may still pass upwardly through the chimney 56 with the water device shown in FIG. 3, it could be apparent that by using the pressure of the piston 67 with the water injector device 65, as shown in FIG. 5, that there will be little need for a chimney and that these gases will disappear into the water and pass through the storage tank where the water can be further purified and used again with this cylinder device 65.

It shall now also be apparent that with the basket 36 that any loose filtering material that may drop from the filter mass 22 will be collected in the bottom of the basket 36. It should also be apparent that the filter mass 22 being made of conical shape, preferably from any suitable filtering material, and retained in a ring 23 having annular spaces at different levels of the filtering mass 22, that a collection of the smoke within these annular spaces will serve to effect the full distribution of the smoke and their entry and re-entry into the tapered side wall 29 until finally the smoke and the gases will be gone from the lower surface of the filter mass 22 under the action of the vacuum pump 49. By this procedure little smoke can remain and any smoke that may pass will be definitely removed by the water spray device. By removal of the top walls 19 from the bottom member 42, access can be had to the filtering mass 22 so that it can be removed from the ring 23 and replaced by another similarly shaped mass. Also upon lifting the ring 23, the bottom of the mesh member 36 can be cleaned or the mesh member 36 can even be removed and washed clean.

While various changes can be made in the detailed construction of this smoke cleaning apparatus it shall be understood that such changes shall be made without departing from the scope of this invention as defined by the apended claims.

What is claimed is:

1. A smoke cleaning apparatus, having a casing, including a top casing, provided with an inlet and a bottom casing, providing a bottom chamber for receiving and connected to the top casing, the bottom casing having a supporting shoulder, a mesh basket resting on the supporting shoulder and a ring supported in the basket, said ring having a plurality of inwardly extending perimetrical flanges varying in width from a smaller size flange at the top to a large size flange at the bottom, a filtering mass having a downwardly and inwardly tapered side wall fitting the inner edges of the flanges of said ring to provide annular spaces for the escape and distribution of smoke from the sides of the filtering mass, and suction fan means connected to the bottom casing for effecting the downward passage of the smoke through the filtering material and the annular spaces between the ring and the tapered outer surface of the filtering material.

2. A smoke cleaning apparatus, as defined in claim 1, and an outlet conduit extending from the suction fan device and a water spray device provided in the conduit comprising a water inlet and spray nozzle adapted to deliver a water spray to fill the conduit, and a sump for collecting the water used by the spray device.

3. A smoke cleaning apparatus, as defined in claim 1, and a water piston cylinder device provided in the conduit receivable of gas-containing smoke from the conduit and said water-piston cylinder device being forceable of water through the smoke to absorb gases within said smoke into the water, an outlet means by which the water having gases absorbed therein can be forced to exit from the cylinder device and from the conduit.

4. A smoke cleaning apparatus, as defined in claim 3, and said cylinder device including a valve controlled bypass extending from one end of the cylinder to the other, a water inlet to the end of the cylinder removed from the smoke inlet end thereof through which water is passed to the cylinder device, said piston upon being moved toward the smoke receiving end of the cylinder receiving water from the water inlet and forcing water through the bypass to the smoke end of the cylinder to conmingle with gasses received therefrom, said smoke end of the cylinder having a discharge outlet through which the water with the gasses are forced upon the piston being moved toward the smoke receiving end of the cylinder, a one -way ball valve in the smoke receiving end of the cylinder for controlling the smoke entering therein to, said water inlet, opposite ends of the bypass and the water outlet on the cylinder having one-way valves for controlling the passage of water into the cylinder, between the opposite ends of the cylinder and out of the cylinder.

* * * * *